United States Patent Office 2,738,279
Patented Mar. 13, 1956

2,738,279

ICE CREAM CONCENTRATE

Edwin G. Stimpson and Randall Whitaker, Sayville, N. Y., assignors to National Dairy Research Laboratories, Inc., Oakdale, N. Y., a corporation of Delaware No Drawing. Application February 1, 1952,
Serial No. 269,576

4 Claims. (Cl. 99—136)

This invention relates to a fluid ice cream concentrate, the sugar content of whose milk solids-not-fat component consists largely of the sugars resulting from the enzyme hydrolysis of lactose.

Ice cream is ordinarily made from milk fat, milk solids-not-fat, sugar, flavoring material and, if desired, stabilizers or emulsifiers. The milk fat contributes a richness of flavor to the ice cream and also improves texture and assists in obtaining a desirable body. The milk solids-not-fat is essential for whipping and also contributes to body and flavor, while the lactose and salt content of the milk solids-not-fat together with the sugar lowers the freezing point of the mix and prevents it from becoming frozen solid, even at very low temperatures. The sugar is also used as a sweetener. Were it not for the lactose and sugar, the ice cream would be entirely lacking in its characteristic desirable qualities.

The milk solids-not-fat content of ice cream usually is of the order of 9 to 11%. At levels above 11%, the lactose content gives rise to a serious problem in ice cream storage. Lactose has a very low solubility in water compared to other sugars, and for this reason such ice cream in a frozen state is supersaturated with respect to lactose. Consequently, the lactose has a tendency to crystallize, giving rise to a gritty condition, due to the lactose crystals, which is known as "sandiness." The melting and refreezing of ice cream that frequently takes place in dealers' cabinets is very favorable to the crystallization of lactose. Crystallization may also be facilitated by the presence in the mix of nutmeats or other finely-divided solids which act as nuclei for the formation of lactose crystals.

The problem of lactose crystallization is encountered to an even greater extent when an atempt is made to formulate a fluid ice cream concentrate which can be reconstituted by dilution with water. Because the manufacturer likes to mix a concentrate with water in a 1:1 ratio, by weight, such a concentrate should have a solids content of 65% or more, the proportions of milk fat, sucrose, and milk solids-not-fat being the same as in straight ice cream. However, a liquid concentrate of this high solids content cannot be stored without extensive lactose crystallization, which, of course, renders the product unfit for use. For this reason, the art has avoided fluid concentrates and has turned instead to the dry ice cream mixes commercially available, even though a dry ice cream mix does not produce an ice cream of as good a quality as the ice cream prepared by standard procedures.

It is possible to largely avoid the problem of lactose crystallization if an ice cream is formulated in which the milk solids-not-fat content is less than 11%. At levels below 11%, the ice cream is supersaturated with respect to lactose at ordinary storage temperatures, but the lactose ordinarily does not crystallize. However, this expedient is not effective in preventing lactose crystallization in a fluid ice cream concentrate because of its high solids content. If the milk solids-not-fat content is reduced to an extent such that lactose does not crystallize from the concentrate, the product does not reconstitute to give a satisfactory ice cream. Moreover, it has long been an object of the art to increase the milk solids-not-fat content of ice cream rather than diminish it.

In an effort to permit the utilization of a greater amount of milk solids-not-fat in ice cream, methods have been developed for the removal of a considerable proportion of the lactose from concentrated skim milk. When this is done, however, other sugars must be added in part to compensate for the loss of lactose. If the lactose is replaced by sucrose, the product tends to become too sweet.

It has also been proposed that the lactose present in milk be hydrolyzed to simple sugars, more soluble in water than lactose, through use of lactase enzyme. According to Patent No. 1,737,101 to G. D. Turnbow, this can be done by adding a lactase enzyme preparation to unpasteurized unconcentrated skim milk, which is then incubated at 158° F. until the desired amount of hydrolysis has taken place. However, according to this process it is possible to hydrolyze only as much as 30% of the lactose, and this is too small a proportion to permit the preparation of a high solids fluid ice cream concentrate from which lactose will not crystallize.

Accordingly, it is an object of the instant invention to provide a reconstitutable fluid ice cream concentrate, a large proportion of the lactose content of whose milk solids-not-fat component has been largely hydrolyzed to simple sugars, including glucose and galactose.

It is also an object of the invention to provide a fluid ice cream concentrate comprising milk solids-not-fat wherein a large proportion of the lactose has been converted to simple sugars, including glucose and galactose, as well as polymerization or addition products thereof, through the action of a lactase enzyme preparation, without appreciably changing either the total carbohydrate content of the milk solids-not-fat or the proportion of carbohydrate to other milk solids-not-fat components.

These objects are accomplished, in accordance with the invention, by formulating a fluid ice cream concentrate comprising milk fat, sugar, and milk solids-not-fat whose sugar content consists of a large proportion, and preferably at least 40%, of the simple sugars, including glucose and galactose, and/or polymerization or addition products of such simple sugars, resulting from the enzyme hydrolysis of at least 40% of the lactose in naturally-occurring milk.

The term "fluid" as used herein in referring to the concentrate of the invention encompasses both concentrate solutions and concentrate emulsions, the latter being more commonly encountered.

The term "milk solids-not-fat" is used generically in the specification and claims to refer to all milk solids other than milk fat present in the milk, including milk protein (casein, lactalbumin and lactoglobulin), lactose, pigments, inorganic salts, as well as minor organic constituents, such as phospholipids and cholesterol. The term "milk serum solids" has also been used in the literature to refer to milk solids-not-fat. The invention contemplates milk solids-not-fat contained in whole milk and skimmed milk, and also that derived from whey and whey waste liquors. The term "milk product" is defined to include whole milk, skimmed milk, whey, and whey and milk waste liquors having a proportion of milk solids-not-fat. The term "milk" is used generically to refer to the milk of any mammal, including cow's milk, mare's milk, goat's milk, ewe's milk, etc.

The preparation of the fluid ice cream concentrate in accordance with the invention for the most part follows conventional, well known methods. The ingredients, i. e., milk product, cream, sugar, flavoring material and stabilizers or emulsifiers, are weighed out to give a fluid mix and the mix is pasteurized, homogenized and concentrated. Milk fat and milk solids-not-fat may be added together in their natural form, as components of milk and cream, or individually, as desired.

The low lactose content milk solids-not-fat employed in the fluid ice cream concentrate of the invention does not per se form any part of the invention. It is, however, indispensable thereto; inasmuch as it is a novel product not hitherto described in the literature, a brief description of the preparation thereof is given to enable those skilled in the art to practice the invention.

The milk solids-not-fat employed in the invention is contained in or derived from a milk product whose lactose content has been hydrolyzed wholly or in part by the action of a lactase enzyme preparation.

It will be understood that during the action of the lactase enzyme the lactose is hydrolyzed to glucose and galactose. However, these simple sugars, during the course of enzyme action, or during subsequent processing of the hydrolyzed lactose-containing milk solids-not-fat, may condense with themselves or with other substances to give polymerization or addition compounds, and these in turn react further to produce a wide variety of both simple and complex sugars of as yet unidentified structure. Compounds formed by reactions of this type appear to some extent during hydrolysis of the lactose, but chiefly are found following subsequent heating, condensing and storing operations. Their presence makes it difficult to determine the extent of hydrolysis of the lactose by analysis for free glucose or galactose alone. Therefore, the extent of hydrolysis of the lactose is determined by analysis for the residual unhydrolyzed lactose and not for its hydrolysis products, and all figures relating to the extent of hydrolysis of lactose are based on the lactose content when the lactase enzyme action is arrested.

The term "hydrolyzed lactose" is used herein to refer to the mixture of sugars, primarily glucose and galactose, but also including addition and polymerization products thereof, which is formed by enzyme hydrolysis of lactose in accordance with the procedures set forth herein.

Any lactase enzyme preparation known to the art may be employed for this purpose, provided it does not affect the flavor of the milk product. A satisfactory lactase enzyme preparation of good flavor is described in Example 1. If the lactase is derived from bacteria, yeasts or molds, it is essential that it be uncontaminated with those enzyme systems, collectively termed "zymase" by the art, which convert glucose and galactose to carbon dioxide and water. Zymase may be destroyed without destroying lactase by drying the yeast under carefully controlled conditions or by plasmolyzing the yeast with an organic solvent, such as toluene, chloroform or ethyl ether, or by heating the yeast in a medium whose pH is about 7. Yeasts which may be employed as the source of lactase enzyme are *Saccharomyces fragilis*, *Torulopsis spherica*, *Zygosaccharomyces lactis*, *Torula utilis* and strains of *Candida pseudo-tropicalis* adapted to the utilization of lactose for growth and fermentation. A lactase enzyme obtained from suitable bacteria, such as *Lactobacillus bulgaricus*, or from a suitable mold such as *Aspergillus oryzae*, may also be used.

The milk product is prepared for hydrolysis by concentrating it to a solids content of at least 20%, and preferably from 30 to 50%, by any well known method which does not change its character or flavor, such as in vacuo at a temperature from 90° F. to 150° F. Preferably the milk product is pasteurized, either before or after concentration, and prior to inoculation with lactase enzyme. Flash pasteurization at 180 to 185° F. for from 10 to 30 seconds or pasteurization by a holding process at from 145 to 160° F. for 30 minutes or longer are preferred.

The milk product is then treated with the lactase enzyme preparation and held at a temperature of from 25 to 135° F. for from 4 hours to 5 days in order to promote action of the enzyme on the lactose. The amount of enzyme may be widely varied, according to the desired extent of hydrolysis. As a guide to selecting the proper amount, from 1.5 to 3% of enzyme by weight of the quantity of lactose present in the milk will bring about hydrolysis of over 85% of the lactose. This is much in excess of the minimum hydrolysis of about 40% needed to produce a product useful in a fluid concentrate of a minimum of 65% solids content. After hydrolysis has proceeded to the desired extent, the mixture is treated to inactivate the lactase enzyme as, for example, by heating the mixture at 160° F. for 30 minutes.

A desirable fluid ice cream concentrate in accordance with the invention will contain milk fat, milk solids-not-fat and sugar, in proportions reached by an appropriate blending of sugar, and unhydrolyzed and hydrolyzed lactose to produce a concentrate containing not over 60% and preferably less than 25% unhydrolyzed lactose. Optimum proportions are from 20 to 28% milk fat, from 20 to 28% milk solids-not-fat whose sugar content consists of at least 40% hydrolyzed lactose, with the remainder unhydrolyzed lactose, and from 24 to 32% sugar. Such a concentrate after dilution with an equal weight of water, whipping and freezing will produce an ice cream having 10 to 14% milk fat, 10 to 14% milk solids-not-fat, and 12 to 16% sugar other than lactose. As the sugar, there can be used sucrose, dextrose (corn sugar), corn syrup solids (mixture of dextrose, maltose and dextrines) or mixtures of these.

A concentrate containing these ingredients in these proportions can be pasteurized, homogenized and condensed to 65% total solids or higher or produce a fluid product which will keep for an indefinite period without developing lactose crystals and which will reconstitute with approximately equal volumes of water to give an ice cream mix that can be frozen in an ice cream freezer or in a freezing compartment of a home refrigerator. A preferred concentrate of 75% total solids comprises 24.5% milk fat, 20.5% milk solids-not-fat and 30% sugar.

It will usually be found convenient to furnish the requisite amounts of milk fat and milk solids-not-fat by use of cream and a milk product whose lactose content has been sufficiently reduced by hydrolysis to bring the total lactose concentration of the concentrate within the limits specified, despite the lactose contained in the cream.

The order of mixing of the ingredients is usually that which permits easy solution thereof. It has no bearing upon the physical properties of the mix or of the finished ice cream, but all of the ingredients must be present during pasteurization.

The solution or emulsification of the ingredients is facilitated by warming the mixture to the pasteurization temperature, i. e., 145 to 175° F. Pasteurization is effected by holding the mix at this temperature for a period inversely proportionate to the temperature. At 145° F. approximately 45 minutes will be required, at 150° F. approximately 30 minutes will be required, while at 175° F. 10 to 20 seconds will be sufficient. During pasteurization pathogenic organisms are destroyed, but the properties of the mix are also affected to some extent.

The pasteurized mix is then homogenized at a pressure in the range of 1500 to 4000 lbs./sq. in. at a temperature within the range from 145 to 175° F. in order to reduce the fat to a fine degree of subdivision and a high degree of dispersion. This will prevent fat separation during processing and storage of the concentrate, and its churning during freezing. It will also impart smoothness to the frozen product.

Thereafter the mix is concentrated, preferably in vacuo or at a low pressure, at a temperature in the range from 90 to 135° F. It is desirable to increase the solids content to at least 65% in order to achieve a ratio of sugar to water of at least 1:1, which is optimum for the prevention of bacterial growth. Hence, at these high solids contents sterilization is not essential in order to preserve the condensed mix. The higher the solids content of the mix, the better the keeping quality, and thus for a commercial product higher solids contents of the order of 75% or greater are preferred. However, if it is convenient to sterilize the mix, it may be concentrated to a lower solids content, but sterilization is not as satisfactory a method of preservation, because of cooked flavor development.

A fluid product having a 65% solids content is reconstitutable with approximately an equal volume of water to form an ice cream composition which after whipping and freezing will produce an ice cream indistinguishable from a high quality previously unconcentrated product. The amount of water of dilution for products of other solids contents is proportionate to this.

During freezing it is desirable to whip air into the diluted concentrate. The expansion or increase of volume of the ice cream is due to the incorporation of air, is referred to as "swell" or "over run" and leads to the production of a palatable product. The milk solids-not-fat is the principal ingredient which facilitates the whipping in of air and in this the carbohydrate content also plays a part because of the effect sugar has upon the freezing point and the viscosity of the mix. After freezing, the product is hardened for from 8 to 24 hours and the ice cream is then ready for use.

The following examples illustrate the preparation of a milk solids-not-fat product whose lactose content has been largely hydrolyzed to simple sugars, including glucose and galactose, and its use in a composition of the invention.

*Example 1*

The solids content of whey derived from casein or cheese manufacture is adjusted to 2 to 8% by weight, and its pH is brought to within the range from 4.5 to 7.0, either by addition of lactic acid or by inoculation with lactic acid-producing bacteria or by treatment with lime. The whey is then heated at 185° F. for 30 minutes in order to coagulate the protein, and the coagulated protein is separated by decantation or filtration.

The deproteinated whey is pasteurized by heating at 145° F. for 45 minutes or at 160° F. for 15 minutes or at 175° F. for 10 seconds, and its pH is taken to be sure it is within the range of 3.5 to 7.5. Preferably the pH of the whey is brought to 4.5. The whey is then inoculated with yeast of a lactase-producing strain, such as *S. fragilis*, and allowed to ferment for from 10 to 30 hours at a temperature of approximately 86° F. During the fermentation it is desirable to aerate the medium with from 0.009 to 0.5 volume of air per volume of medium per minute.

The yeast cells are separated from the fermentation liquor and washed with warm water.

The yeast is then dried in any of several ways. Freeze drying in vacuo at 0 to 30° F. is particularly advantageous. The yeast may also be spray dried if it is dispersed in water to form a yeast suspension of from 10 to 18% solids content. The yeast suspension is fed into a spray drier whose inlet air stream is at a temperature of about 250° F. and whose outlet air stream is at approximately 170° F. The dry yeast powder is cooled to room temperature as quickly as possible after leaving the spray drier and is stored at 40° F. until use.

The yeast may also be dried in a try drier provided the temperature does not exceed 150° F. The drying cycle should be completed in about 2.5 hours in an atmospheric tray drier or in about 4 hours in a vacuum tray drier.

The drying temperatures and times above given are applicable to any lactase-containing yeasts but they must be carefully controlled within the ranges given in order to keep the loss of lactase enzyme activity at a minimum and produce a dry enough produce. During the drying operation the zymase is rendered inactive but lactase activity is substantially unaffected.

The dry product from the freeze, tray or spray driers has strong potency and good stability. It has a good light color and a bland flavor, and does not impart an undesirable flavor to milk products in which it is incorporated.

To prepare raw whole milk for lactose hydrolysis, the milk is separated, and the resulting skim milk pasteurized at 160° F. for 30 minutes, then condensed in vacuo at a low temperature to a 30% solids content. The temperature of the condensed milk is adjusted to 123° F. Yeast lactase prepared as set forth above is dispersed in four times its weight of water to form a slurry, and this slurry is added to the skim milk in a ratio of one part by weight yeast lactase to each fifty parts by weight of lactose in the skim milk. During addition of the lactase slurry the skim milk is agitated. The mixture is then held at 123° F. for 4 hours, at the end of which time 80 to 90% of the lactose has been hydrolyzed to simple sugars, including glucose and galactose. In order to inactivate the lactase enzyme, the mixture is heated at 160° F. for 30 minutes.

Cream and sucrose are incorporated with the concentrate to give a composition containing 12% milk fat, 10% milk solids-not-fat and the 15% sucrose, the remainder being water. The mixture is stirred until all of the components are dissolved and is then heated at 175° F. for 20 seconds, to pasteurize the mix, homogenized at 2000 lbs./sq. in. and 145° F., and concentrated at 90° F. in vacuo to a solids content of 75%. It is then cooled to 40° F. and stored.

A portion of the product is blended with an equal part by volume of water, whipped, frozen and hardened at −20° F. The product is an ice cream indistinguishable in texture, body and flavor from an unconcentrated ice cream prepared from the same ingredients under the same conditions, but without concentration to 75% solids followed by dilution with water.

*Example 2*

Raw whole milk is flash pasteurized at 175° F. for 15 seconds and condensed in vacuo at a temperature of 110° F. to a 40% solids content. The condensed milk is then heated at 160° F. for 30 minutes and then tempered to 123° F. Yeast lactase prepared as set forth in Example 1 is then added to the condensed whole milk in a ratio of one part by weight yeast lactase to each fifty parts by weight of lactose in the condensed milk. The mixture is then held at 123° F. for 4 hours at the end of which time 80 to 90% of the lactose has been hydrolyzed. In order to inactivate the lactase enzyme the mixture is heated at 160° F. for 30 minutes and cooled to 40° F.

When it is desired to manufacture the concentrated ice cream mix this product is blended with cream and sugar to produce a final composition of 12% fat, 10.5% milk solids-not-fat, and 15.5% sugar comprising a mixture of corn sugar and sucrose together with 0.015% gelatin and 0.05% of polyoxyethylene sorbitan monostearate (Tween 65), the remainder being water. The completed mixture is then pasteurized at 155° F. for 30 minutes, homogenized at 2500 lbs./sq. in. at 155° F., and concentrated at 125° F. under reduced pressure to a solids content of 65%. The product is then packaged and sealed in cans or jars for use at some subsequent date and stored at 40° F.

This concentrate can be mixed with water, frozen and whipped as set forth in Example 1 to give an ice cream indistinguishable in texture, body and flavor from an unconcentrated ice cream prepared from the same ingredients under the same conditions.

A can of hydrolyzed lactose-containing ice cream mix concentrate has been stored at 40° F. for as long as 23 months without appreciable change. No lactose crystallization took place, no protein coagulation of whey separation developed during this period and the product was entirely uniform and smooth throughout the container. The color and odor were substantially the same as when packed. The flavor was slightly oxidized, but in view of the long storage period was relatively quite good. On warming to room temperature the material flowed like a heavy molasses and appeared in all respects to be equivalent to the original product.

*Example 3*

Raw whole milk and 40% cream are blended to give a ratio of 10 parts fat to 10 parts milk solids-not fat. This mixture is heated to 165° F. and held at this temperature for 30 minutes. It is then condensed in vacuo at a temperature of 100° F. to a 40% solids content. The temperature of the condensed milk is adjusted to 123° F. and treated with yeast lactase as described in Example 1. At the end of 4 hours at 123° F. the lactase enzyme is inactivated by heating the mixture to 160° F. for 30 minutes. Sucrose is added to give a ratio of 10 parts fat, 10 parts milk solids-not-fat, and 16 parts sucrose. This mixture is homogenized at 3,000 lbs./sq. in. at 155° F. and concentrated to 73% total solids under vacuum at 120° F. The product is then cooled to 40° F. and stored in five-gallon cans for subsequent delivery to ice cream manufacturers. The concentrate so packed without sealing does not deteriorate on storage for 6–10 weeks at room temperature and consequently can be shipped without benefit of refrigeration from the point of production to ice cream manufacturers remote from the source of supply.

Various modifications and changes may be made in the conditions under which the composition is formulated, as will be apparent to those skilled in the art, and it will be understood that the invention is not to be limited, except as set forth in the following claims.

We claim:

1. A fluid ice cream concentrate having a total solids content of at least 65%, comprising milk fat, sugar, and milk solids-not-fat whose saccharide content consists of at least 40% hydrolyzed lactose and the remainder unhydrolyzed lactose.

2. A fluid ice cream concentrate in accordance with claim 1, comprising approximately 32.5% milk fat, approximately 25.0% milk solids-not-fat and approximately 40.5% sugar.

3. A fluid ice cream concentrate having a total solids content of at least 65%, comprising milk fat, sugar, and milk solids-not-fat at least 40% of whose saccharide content consists of hydrolyzed lactose, the amount of said hydrolyzed lactose relative to the amount of lactose and other milk solids-not-fat components being substantially equivalent to that resulting from the lactase hydrolysis of 40% of the lactose in naturally-occurring milk.

4. Ice cream comprising milk fat, sugar, and milk solids-not-fat whose lactose content consists of at least 40% of hydrolyzed lactose and the remainder unhydrolyzed lactose.

References Cited in the file of this patent

UNITED STATES PATENTS

| | | |
|---|---|---|
| 1,737,101 | Turnbow | Nov. 26, 1929 |
| 2,449,064 | Engel | Sept. 14, 1948 |

OTHER REFERENCES

General Chemistry of the Enzymes, by H. Euler, first edition, pub. 1912 by John Wiley & Sons, pages 30, 31, 100, 168, 169, 170, 171.

Chemistry and Technology of Enzymes, by H. Tauber, copyright 1949, pub. by John Wiley & Sons Inc., pages 8, 57, 58.

The Enzymes, vol. II, part 2, by J. B. Sumner, K. Myrback, pub. 1952 by Academic Press, New York, pages 1327, 1328.